United States Patent [19]
Osdor

[11] 3,734,160
[45] May 22, 1973

[54] FLASH EVAPORATION USING SURFACE ACTIVE AGENT AND IMMISCIBLE LIQUID

[75] Inventor: Asriel Osdor, Tel Aviv, Israel

[73] Assignee: Hydro Chemical & Mineral Corp., New York, N.Y.

[22] Filed: May 15, 1970

[21] Appl. No.: 37,530

[52] U.S. Cl. ................... 159/47 R, 202/234, 203/10, 203/100, 159/DIG. 17
[51] Int. Cl. ......... B01d 1/00, F26b 7/00, B01d 3/00, B01d 3/10, C02b 1/04
[58] Field of Search ............... 159/DIG. 17, DIG. 20; 203/10, 11, 100, 6, 7, 53, 57; 202/234, 235; 252/180, 550, 557, 580

[56] References Cited

UNITED STATES PATENTS

| | | | |
|---|---|---|---|
| 2,446,159 | 7/1948 | Mottern et al. | 203/7 |
| 2,494,325 | 1/1950 | Anne et al. | 203/7 |
| 3,186,924 | 6/1965 | Williamson | 159/2 MS X |
| 3,248,181 | 4/1966 | Akimoto | 23/300 |
| 3,303,106 | 2/1967 | Standiford, Jr. | 203/27 |
| 3,220,934 | 11/1965 | Beredjick | 203/10 |
| 3,441,075 | 4/1969 | Wildi et al. | 203/100 |

Primary Examiner—Norman Yudkoff
Assistant Examiner—J. Sofer
Attorney—Ward, McElhannon, Brooks & Fitzpatrick

[57] ABSTRACT

Flash evaporation from a mixture of a solution to be vaporized, a heat transfer liquid immiscible in the solution and a surface active agent capable of reducing interfacial tension between the solution (the dispersed phase), and the heat transfer liquid (the continuous phase), most of the surface active agent being salted out of the solution as the solution reaches higher concentrations but which agent is kept in dispersed suspension in the heat transfer fluid by agitation of the mixture, such suspension serving to maintain reduction of interfacial tension between the concentrated solution dispersed within the heat transfer liquid, and recovery thereafter of the surface active agent for reuse in the process.

29 Claims, 3 Drawing Figures

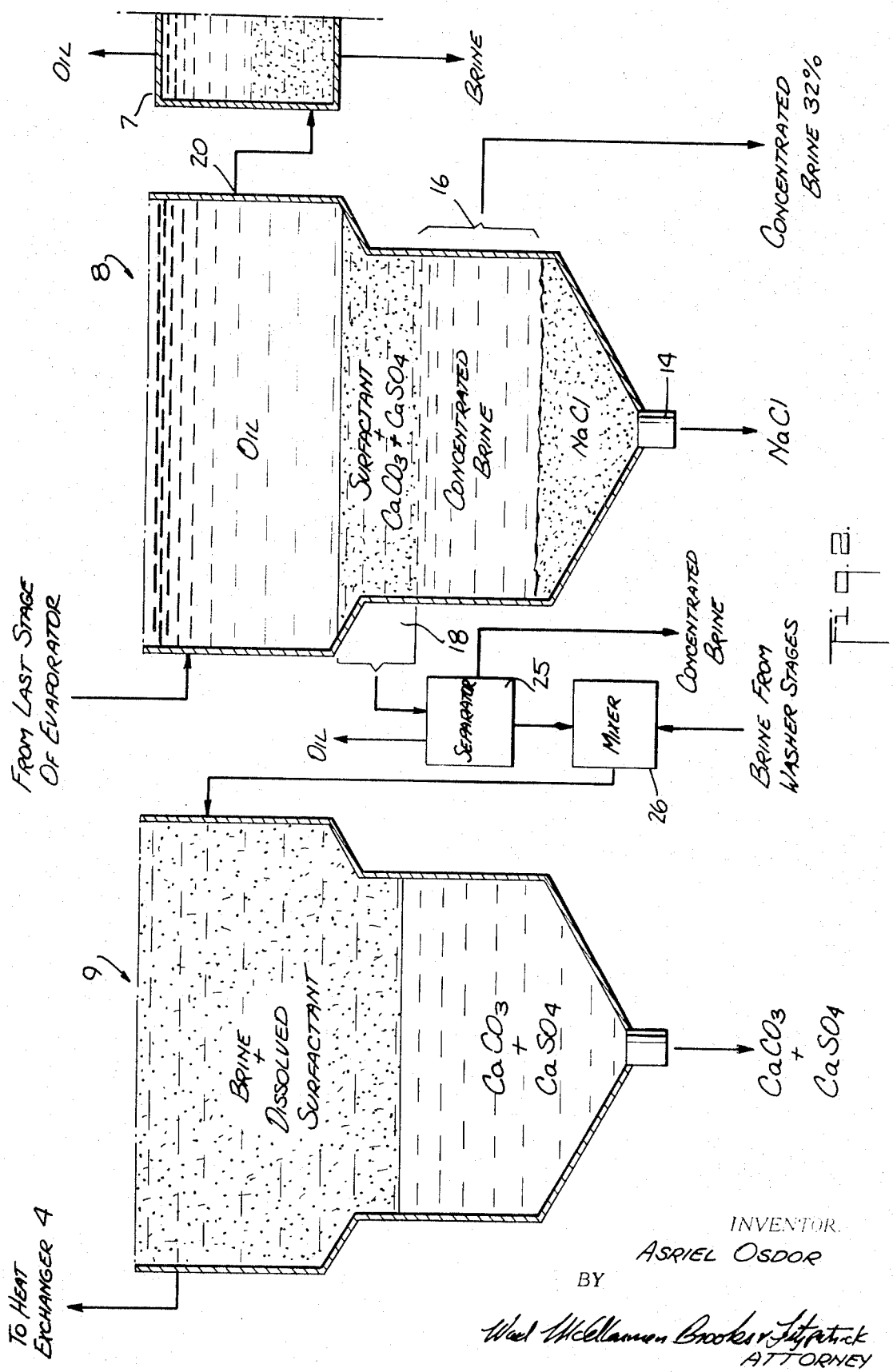

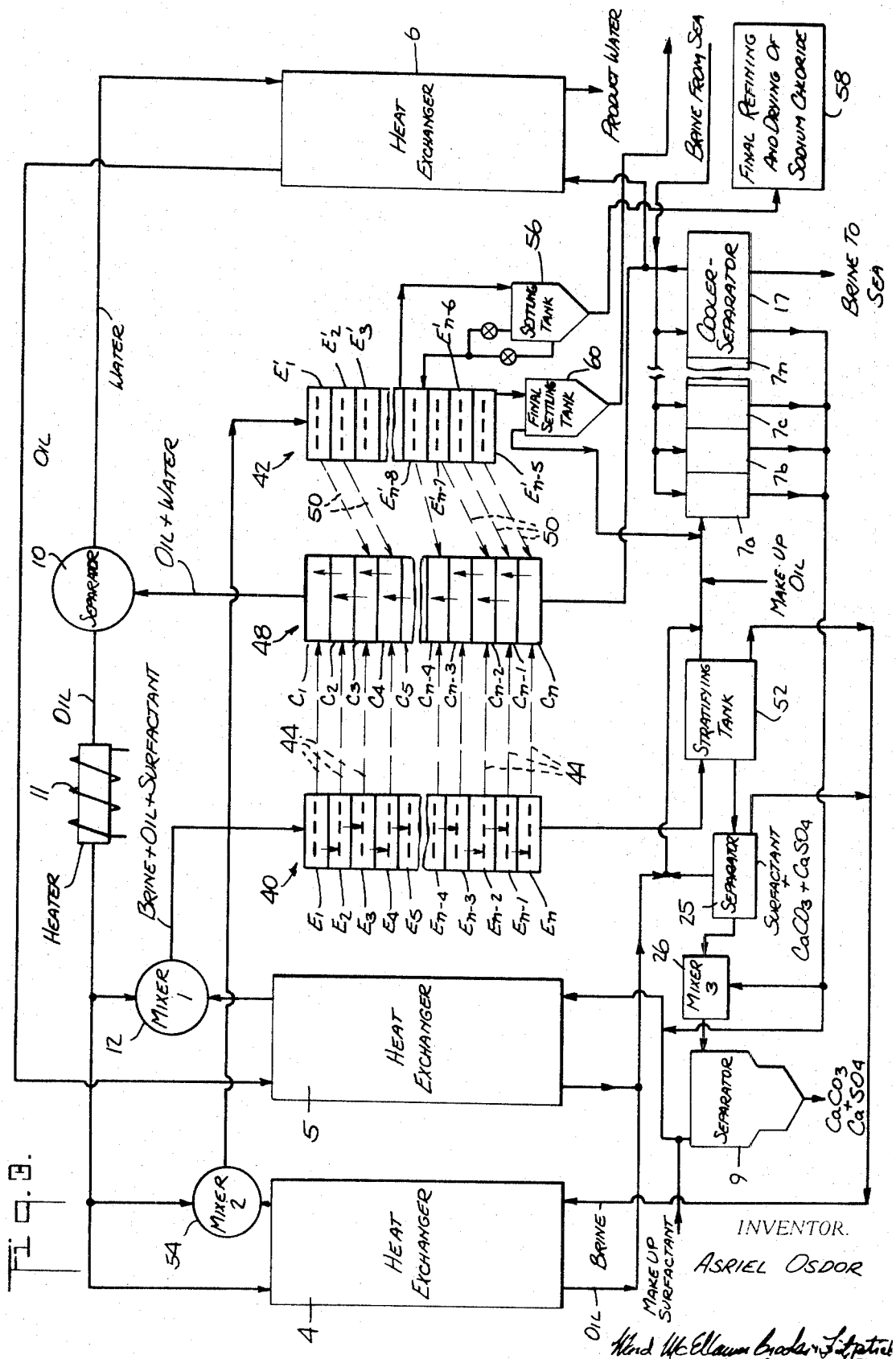

FLASH EVAPORATION USING SURFACE ACTIVE AGENT AND IMMISCIBLE LIQUID

This invention relates to flash vaporization systems, and more particularly it concerns novel arrangements for improving the effectiveness of vaporization in systems wherein a heat transfer liquid, immiscible in the liquid being subjected to vaporization, is mixed with that liquid to provide a major portion of the heat used in the vaporization process.

The present invention is particularly useful in connection with multistage flash distillation systems and will be described herein as specifically applied to such a system. Multistage flash distillation systems are used in great part to separate fresh water from a saline aqueous solution such as sea water or brine.

In order to obtain greater vaporization for a given temperature and pressure range, it has been proposed to mix the heated saline water with a heat transfer liquid, such as oil, and to pass the two liquids together through the multistage evaporator. Such a system is shown and described in a copending application Ser. No. 831,087 filed June 6, 1969 and assigned to the assignee of the present invention. The use of a heat transfer liquid in this manner permits the carrying out of a greater degree of vaporization since the heat transfer fluid acts as a heat reservoir from which the latent heat of vaporization of larger percentages of the saline water may be drawn. Thus, a high concentration brine and valuable salts and minerals may be recovered. Other advantages obtained from the use of heat transfer liquids are as described in the aforementioned copending application.

In the past, certain difficulties have been experienced in connection with the use of heat transfer liquids. One of these difficulties arises from the necessary property of immiscibility of the heat transfer liquid in the saline water because it is important to recover the heat transfer liquid from the blowdown mixture for recycling purposes; and in order to do this, the heat transfer liquid must be immiscible in and readily separable from the saline water. Generally, petroleum products and the like are chosen as heat transfer liquids because of their property of immiscibility in water or water solutions.

To produce highly concentrated brine and to precipitate sodium chloride from sea water, the incoming oil-sea water mixture should contain more than 75 percent of oil by volume.

Now by thorough mixing, which is required for good heat transfer from the oil to the sea water, the latter, which is the volatile component to be evaporated, becomes the dispersed phase (i.e., is in the form of droplets dispersed in and surrounded by the oil.) The interfacial tension between the brine droplets and the oil results in a considerable temperature difference between the boiling brine and the leaving steam. This temperature difference is in excess of that due solely to the dissolved salts, which is generally known as boiling point elevation. It is greater than that due to superheating of brine or water alone at the same temperature and pressure. (See explanation of superheating of liquid in "Heat Transfer" by Jakob Max, Vol. 1, pages 615–617.)

The above-mentioned excess of the temperature difference will be defined as a two-phase superheating, or for brevity, "superheating."

The present invention is directed to reducing said superheating created by the relatively high interfacial tension between two mutually immiscible liquids such as oil as the continuous phase and water as the dispersed phase. This is achieved, according to the present invention, by means of a surface active agent, hereinafter referred to as a "surfactant" which reduces the interfacial tension between the two liquids and reduces the temperature differences between the volatile liquid components of the fluid system and the leaving vapor. Also, the surfactant helps to obtain, by agitation of the oil-brine mixture, very small brine droplets which means a great contact area for heat transfer between the oil and the flashing brine in such multistage flash distillation system.

The present invention, moreover, permits the two liquids to be separated with relative ease following the multistage evaporation operation. Actually, according to one aspect of the invention, the bulk of the surfactant is recovered so that it can be recycled through the system.

The present invention is based in part on the discovery that a surfactant is capable of reducing interfacial tension between immiscible liquids not only when it is dissolved in one of the liquids, but also when it is maintained in the liquids in a dispersed suspension, as by agitation, so that the surfactant itself will not settle and separate. In further part, the present invention is based on the discovery that in a flash vaporization process, less and less of the surfactant will remain dissolved in the liquid solution as the concentration of its nonvolatile components increases due to vaporization of the volatile components. In an oil-sea water system for example, a surfactant, such as sodium lauryl sulfate, may initially dissolve in the relatively low salt concentration sea water. However, as vaporization proceeds and the salt concentration of the remaining brine increases, less and less of the surfactant will remain dissolved in the brine. That is, the surfactant actually separates ("salts out", coagulates, etc.) of the brine. Nevertheless, by maintaining the liquid mixture in agitation, the surfactant present is effective to lower interfacial tension. Moreover, upon completion of vaporization, the surfactant is easily recovered from the residue brine and from the precipitated salts by taking advantage of another discovery, that is by allowing the nonevaporated residue to settle and stratify the surfactant and is separated in a layer at the oil-brine interphase. This interphase layer contains also practically all the calcium carbonate and sulfate which could be easily separated from the surfactant by dissolving the latter in new sea water.

As will be apparent from the foregoing, the surfactant material should conform to certain solubility criteria, i.e., the material selected should be substantially insoluble in the distillation residue produced in the latter part of the evaporation process. Thus, in the case of sea water desalination wherein it is desired to precipitate the bulk of the sodium chloride and to produce a residual brine having a salt concentration on the order of about 30 percent, the surfactant should be substantially insoluble in said highly concentrated brine, but should nevertheless be capable to reduce the interfacial tension between the latter and the oil provided that it is maintained by strong agitation in a dispersed suspension.

It is, of course, important that the surfactant, in dissolved or in particulate suspension, be present at every location where reduction of interfacial tension between oil and solution is required.

In accordance with preferred practice, however, the surfactant material should exhibit substantial solubility or dispersibility in the feed solution. As will be described more fully hereinafter, this permits to recover the salted out surfactant by dissolving the same in a portion of new incoming feed solution so that recycling of the surfactant is easily realized. It is likewise preferred that the surfactant be substantially insoluble or only slightly soluble in the heat transfer oil so that it can be separated from this liquid as well. A large number of surface active materials or surfactants are substantially insoluble in low polar or non-polar solvents, such as petroleum oils that are immiscible in water and brine and could be used in sea water distillation systems.

In those instances where some possibility exists of a carryover of finite amounts of the surfactant to the product solvent condensate and wherein the condensate is intended for human consumption, e.g., potable water from brine, the surfactant should be non-toxic and substantially devoid of any tendency to impart a taste to such condensate. By repeated washing or by countercurrent washing of the oil separated from the residual brine-oil mixture with new sea water, it is possible to extract practically all the surfactant that may remain in said separated oil.

The quantity of surfactant utilized is a function of its surface active properties and is proportional to the volume of the residual brine so that the greater the concentration of the residual brine, the smaller the quantity of surfactant utilized per unit of feed solution. The essential requirement in this regard is that the quantity selected be sufficient to reduce solution-oil interfacial tension to a suitable level. As a general proposition, beneficial results are obtained with the use of surfactant in concentrations ranging from about 0.05 to 1.0 percent by weight of the residual brine volume, with a range of 0.1 to 0.5 percent being particularly preferred. These ranges should provide satisfactory results in most applications likely to be encountered. However, departures from such values may be dictated in a specific instance due to special requirements.

The surfactant materials used in the practice of the present invention may be selected from a wide variety of substances having reference to the foregoing discussion regarding solubility, dispersibility, surface tension reducing capabilities, etc. Where sea water is to be processed, ordinary soaps, such as represented by sodium stearate, should not be used because they exhibit a pronounced and objectionable tendency to react with magnesium and calcium present in the concentrated brines to form insoluble substances which are not readily redissolved.

Surfactants comprise an art-recognized class of materials characterized by a molecular structure containing both hydrophobic and hydrophilic moieties. The hydrophobic moiety is usually comprised of a relatively long chain hydrocarbon group derived, for example, from fatty acid or fatty alcohol molecules. The hydrophilic moiety is imparted to the molecule by introducing water-solubilizing groups, e.g., sulfate, phosphate sulfonate and the like. In general, increasing the carbon content of the hydrophobic moiety renders the material more oil-soluble.

Surfactant materials presently preferred for use with oil-brine mixtures are sodium lauryl sulfate, fatty alcohol phosphates, sodium dioctyl sulfosuccinate, and sodium dodecyl benzene sulfonate.

The immiscible, liquid heat transfer materials suitable for use herein may comprise normally liquid hydrocarbons as well as mixtures thereof. Various petroleum fractions including kerosene, naphtha, odorless spirits and gasoline may be used. Preferred hydrocarbons for use in sea water evaporation for the production of potable pure water are those which are stable under the temperature and pressure conditions employed in the process and have low toxicity and low solubility in water at normal temperatures and pressure. Also, for such application, the oil should not impart any taste to the product water.

The total amount of immiscible heat transfer oil initially charged to the evaporation system may likewise vary over a relatively wide range and should in any event be sufficient to furnish to the solvent-solute solution the necessary latent heat of vaporization over the temperature range encountered. The present invention, however, is of particular advantage in situations where the oil-water ratio is high enough so that the oil assumes the continuous phase while the water assumes the dispersed phase.

Various further and more specific objects, features and advantages of the invention will appear from the description given below, taken in connection with the accompanying drawings, illustrating by way of example preferred forms of the invention.

In the drawings:

FIG. 2 is a more detailed representation of separator units forming a portion of the system of FIG. 1; and FIG. 3 is a view similar to FIG. 1, but showing a multiple cycle system in which the present invention is embodied.

Figure 1:
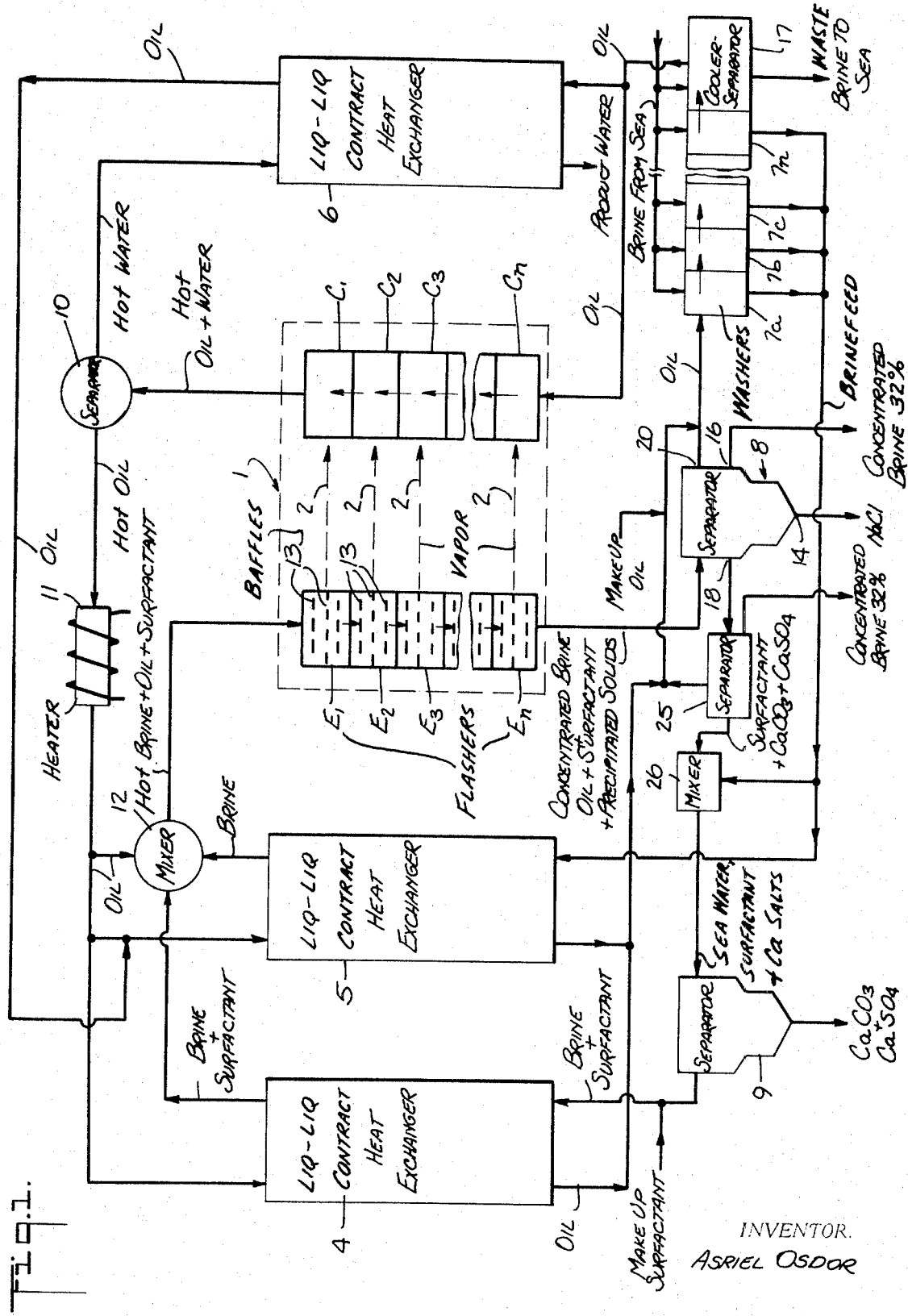
FIG. 1 is a diagrammatic representation by way of example of a single cycle system in which the present invention is embodied.

The following discussion will refer specifically to the desalination of sea water; however, it will be understood that the principles of the present invention may find wide application in a number of different environments.

Referring to FIG. 1, a mixture comprising heated sea water or brine at saturation pressure, hot oil and surfactant is introduced into the first stage $E_1$ of a multistage flash evaporation and recovery unit 1. This unit, as shown, comprises an enclosed vessel within which are located a plurality of intercommunicating, serially arranged flash chambers or vaporization zones, $E_1 \ldots E_n$, and an equal plurality of associated, intercommunicating condenser chambers $C_1 \ldots C_n$, maintained at successively lower pressures and temperatures. The condenser spaces are in vapor communication, as indicated by arrows 2, with their associated evaporator stages. The condenser stages may be interspersed as described in my Patent application Ser. No. 847,103 filed Aug. 4, 1969, now U.S. Pat. No. 3627646.

The first stage evaporation chamber $E_1$ is maintained at a temperature and pressure somewhat less than that of the incoming brine; and as the incoming brine, which is at saturation conditions, encounters this reduced pressure, a portion of it vaporizes with concomitant cooling of both the unevaporated brine portion and the accompanying oil. The latent heat of vaporization is obtained from the loss of heat by cooling of these liquids. The unevaporated brine and oil, and the surfactant, flow into a second stage flash chamber $E_2$, maintained at a lower temperature and pressure than that prevailing in the first stage chamber $E_1$. Fluid communication between the respective evaporation chambers may be accomplished for example as shown in any of several known ways, and described in my copending application Ser. No. 831087 filed June 6, 1969. Baffle plates 13 serve to promote turbulence in the brine-oil feed to each evaporation chamber. This turbulence ensures adequate mixing of the oil and brine as well as the dispersal of any surfactant not dissolved in the brine.

The pressure of the vapors in the second stage flash chamber $E_2$ is maintained at a value lower than that of the first stage chamber $E_1$; and again, by virtue of heat abstracted from both the oil and brine components, a portion of the water in the incoming brine, i.e., the liquid residue from the first stage chamber $E_1$, is vaporized. The temperature of the brine-oil-surfactant mixture in the second stage $E_2$ is lower than that of the first stage. The process is repeated in each stage, that is, the liquid residue passes serially into each of the evaporation stages at successively reduced pressures with resulting incremental volatilization of water in each stage and correspondingly increased salt concentration of the resulting brine. A certain amount of the oil vaporizes also; however, this will be minimal so long as the oil used has a substantially lower vapor pressure than that of the solution.

The oil-brine-surfactant mixture introduced into the first stage evaporation chamber $E_1$ contains surfactant in an amount such that all or nearly all of it is dissolved in the brine. The brine at this point has a salt concentration of about 3.5 percent which is normal for sea water. In the latter stages of vaporization, however, the salt concentration of the residue brine increases by virtue of the fact that the pure water portion is being separated as vapor. This salt concentration may reach 20–30 percent or higher so that the salts themselves may actually precipitate out from the solution.

The increased salt concentration in the latter stages of vaporization also reduces the amount of surfactant which may remain dissolved; and, in fact, in the last stage, only traces of surfactant may be present in solution. The bulk of the surfactant is maintained in dispersed condition throughout the oil-brine mixture, however, by keeping the mixture in a state of agitation, for example by means of the baffles 13.

As indicated previously, it has been discovered that the surfactant is effective in reducing interfacial tension even when not dissolved in the brine so long as the surfactant is maintained in a state of dispersion throughout the oil-brine mixture. Thus, the surfactant may be used in a manner which permits ready recovery since, after the last stage of evaporation, the liquids may be allowed to settle and the non-dissolved surfactant will readily separate from the oil and water, and from the precipitated sodium chloride (see above). The manner in which this is carried out will be described more fully hereinafter.

The water vapors generated in each of the evaporation chambers $E_1 \ldots E_n$ pass, as indicated by the arrows 2, into the corresponding condenser spaced $C_1 \ldots C_n$.

In each condenser space, the water vapors directly contact cooler recycle oil circulating through the condenser of unit 1 and upon so directly contacting the oil in any known manner, these vapors condense on it and travel along with it through the unit 1. During such condensation, water vapor releases its heat of vaporization and thereby heats the oil. The oil and water condensate components of the mixture are withdrawn from the highest temperature condenser space $C_1$ and pass through a separator 10 where they are separated. The oil and water are thereafter separately conveyed to different units in the system where their heat content can be recovered. Thus, the hot product water or condensate from the separator 10 is passed to a first liquid-liquid heat exchanger 6 where it directly contacts and heats oil passing up from a cooler-separator 7. The high temperature oil from the separator 10 in turn is heated in a heater 11 to an even higher temperature and is then mixed with preheated sea water or brine and a preheated solution of brine and surfactant in a mixer 12. The resulting mixture is then directed into the first evaporation stage $E_1$ of the unit 1, and passes through each of the stages in succession to produce vapors as above described.

The incoming sea water or brine is preheated in a second liquid-liquid heat exchanger 5 where it contacts the oil from the first heat exchanger 6. It will be appreciated that the heat from the product water is thus transferred, via the oil passing through the two heat exchangers 6 and 5, to the incoming sea water or brine. The brine and surfactant solution which is mixed in the mixer 12 is separately preheated in a third liquid-liquid heat exchanger 4 by passing this solution through the heat exchanger in countercurrent flow relationship with some of the oil from the heater 11. It will be appreciated that the oil heated by the hot product water is insufficient to produce the total heating required for the feed brine. Therefore, additional hot oil from the first condenser stage $C_1$, and further heated in the heater is used to supply the additional heat required by the brine.

The residue from the last evaporator stage $E_n$, passes into a first separator 8. The residue from the last evaporator stage $E_n$ includes highly concentrated brine, oil, salts and surfactant. These materials, when allowed to settle quietly in the separator 8, stratify and assume various levels in the separator. As a result, it is possible to extract the several mixture components separately by providing outlet conduits at these different levels. Thus, as indicated in FIG. 1, there is provided a sodium chloride outlet 14 at the bottom of the separator 8, a concentrated brine outlet 16 above the sodium chloride outlet 14, an outlet 18 for surfactant and entrained materials precipitated calcium, carbonate and sulfate, above the concentrated brine outlet 16 and an oil outlet 20 at the upper portion of the precipitator. The oil which exits from the oil outlet 20 passes, along with the oil which has given up its heat in the second and third exchangers 5 and 4 is passed serially through a series of washer stages $7_a, 7_b \ldots 7_n$, and then through a cooler and separator stage 17. Cool sea water is supplied in parallel fashion to each of the stages where it is mixed with the oil and thereafter separated either by settling or centrifuging. This sea water mixing and separating process, in addition to cooling the oil, also serves to extract from it any impurities, and especially any surfactant which may have been carried along with it. This is because the salt concentration of the sea water used for washing the oil is sufficiently low so as to enable the traces of surfactant which may be present in the oil to dissolve in the sea water and thereby becomes separated from the oil. The number of washer stages 7 can be reduced and the stages themselves made smaller by employing a coalescing unit in the cooler-separator stage 17. Some of the oil from the cooler-separator stage 17 is then supplied to the last condenser stage $C_n$ to pass serially through the stages to the first stage $C_1$. Oil from the separator 17 is also supplied to the heat exchanger 6. The separator 17 is provided with a sea water outlet 22 which directs spent heat reject sea water back to the sea. Also, the washer stages $7_a \ldots 7_n$ are each provided with a sea water outlet which communicates with a mixer 26 and with the second heat exchanger 5.

A sludge-like interphase layer of surfactant, brine and oil, and insoluble calcium salts, such as $CaCO_3$ or $CaSO_4$, passes from the outlet 18 of the first separator 8 into a brine-oil-solids separator 25, which may be a centrifuge device. A certain amount of brine and oil accompany the surfactant-calcium salt suspension into the brine-oil-solids separator. These various constituents may be separated by combined filtration and settling, or they may be centrifuged so that brine, oil and a thick sludge of the surfactant and the calcium salts are separated. The separated oil is returned to the washer 7 and separator 17. The separated concentrated brine may be disposed of in any convenient manner. The separated sludge from the interphase layer is then directed into a mixer 26 where it becomes mixed with a small portion of the incoming sea water or sea water from the washer stages $7_a \ldots 7_n$. From there, the sea water, surfactant and calcium salts pass into a second separator 9 where they are again allowed to settle. The incoming sea water dissolves the surfactant and the insoluble calcium salts settle to the bottom of the separator 9. The supernatant brine containing the dissolved surfactant is then directed through the third heat exchanger 4 where it is heated and thereafter mixed in the mixer 12, as previously described.

The enlarged diagrammatic representations of the separators 8 and 9 shown in FIG. 2, serve to illustrate the manner in which surfactant recovery and selective salt recovery can be achieved according to the present invention. As can be seen in FIG. 2, the various components including oil, surfactant, calcium salts, concentrated brine and sodium chloride, when allowed to settle in the first separator 8, stratify themselves in different layers. Sodium chloride separates from the concentrated brine due to the fact that the concentrated brine after reaching saturation of this salt is being further evaporated in the last stage of the system. Also, since the sodium chloride which precipitates from the concentrated brine is heavier than the brine solution, it separates at the bottom of the brine solution, as indicated. Further, because of the high concentration of the brine solution, it becomes incapable of holding substantial surfactant in solution; and since the surfactant is no longer maintained in dispersed condition by agitation, the surfactant forms an interphase layer. This layer also contains insoluble calcium salts which precipitated in the evaporation process. The interphase layer, surprisingly, locates itself between the upper oil layer and the lower brine layers, in spite of the fact that its salt constituents, namely calcium carbonate and calcium sulfate, are both heavier than the brine and its surfactant constituent is also in most cases heavier than the brine. This phenomenon could be explained by the fact that the interphase layer contains a certain amount of oil which contributes to a reduction of the overall specific gravity of the layer.

The present invention, as will be seen, makes use of this interphase layer formation phenomenon to achieve separation of the precipitated calcium carbonate and calcium sulfate from the concentrated brine and also from the precipitated sodium chloride so that the sodium chloride may be recovered in a substantially pure state.

As indicated previously, the precipitated sodium chloride, the residue concentrated brine and the oil are all directed out through their associated outlets and are disposed of as desired. The interphase layer, however, is in the form of a sludge made up of brine, oil, surfactant and insoluble salts, passes into the separator 25 where further oil and brine removal is obtained such as by centrifugal action or by some filtration. The resulting residue is mixed in a mixer 26 with additional sea water of minimal salt concentration. This additional sea water, because of its relatively low salt concentration, is capable of dissolving the surfactant, thereby removing it from the residual insoluble components such as calcium carbonate and calcium sulfate. The mixture is then transferred to the separator 9, where the insoluble components, because of their higher specific gravity, settle at the bottom of the separator and are then extracted. The remaining brine and dissolved surfactant are then, as previously described, preheated in the third heat exchanger 4 and then passed into the mixer 12.

It will be appreciated that with the above-described system, surfactant material may be recovered and recycled continuously in the system. Also, the surfactant may be utilized in a very beneficial way to separately extract sodium salts and calcium sulfates and carbonates. This is achieved in the present invention by making use of the water solubility of the surfactant as well as the ability of the surfactant to form, in a water-oil system, an interphase layer which holds the insoluble calcium carbonate and calcium sulfate salts above the concentrated brine saturated with sodium chloride that may have at its bottom sodium chloride crystals.

It may be necessary, from time to time, to replenish the surfactant to compensate for any traces which may be lost from various points in the system. This additional surfactant can be supplied at any convenient point, for example, at the inlet to the third heat exchanger 4, as indicated in FIG. 1. Similarly, makeup oil can be supplied at any convenient place, such as the input to the cooler separator 7, should this become necessary.

One requirement of this fresh water recovery process utilizing surface active materials is that the product water and the sea water used as the heat reject medium is discharged with concentration levels of surface active material which does not exceed acceptable limits. This limit is 0.5 ppm surface active material, as stated in the publication of the American Public Health Association, Inc., "Standard Methods For The Examination Of Water And Wastewater," page 296.

By successive washing in the washer stages $7_a \ldots 7_n$ of the oil from the separator 8 and the separator 25, any entrained surface active material is removed from the oil. The quantity of surface active material removed from the oil after each wash is so high that the final wash with the sea water used as the heat reject medium shows a concentration of less than 0.5 ppm in this rejected sea water. The surface active material concentration in pure water which has been contacted with the oil leaving the final wash step above has further been shown to be significantly less than 0.5 ppm.

It has also been determined in experiments that the maximum solubility of sodium lauryl sulfate (SLS) used as a surface active agent is less than 0.1 parts per million in oil. Thus, practically all of the SLS found in the oil which has been separated from the blowdown brine is in the form of a particulate suspension. An alternative to successive batch washing or countercurrent washings with sea water may be obtained by centrifuging the oil with or without small quantities of wash water.

The present invention is suited for use in multiple cycle desalination systems such as that shown and described in my copending application Ser. No. 831,087 filed June 6, 1969. FIG. 3 shows in diagramatic form one version of a multiple cycle desalination system in which the present invention is embodied.

The system shown in FIG. 3 is generally similar to that shown in FIG. 1. However, in the system of FIG. 3 there are provided two series of evaporator stages 40 and 42 each of which are connected to transfer vapors as indicated by the dotted vapor transfer lines 44 and 50 to various ones of a single series of condenser stages 48. As indicated in the drawing, the various evaporator stages of the first series 40 are designated respectively as $E_1$, $E_2$, $E_3$, $E_4$, $E_5$, ... $E_{n-4}$, $E_{n-3}$, $E_{n-2}$, $E_{n-1}$ and $E_n$. The condenser stages 48 are correspondingly designated $C_1$, $C_2$, $C_3$, $C_4$, $C_5$, ... $C_{n-4}$, $C_{n-3}$, $C_{n-2}$, $C_{n-1}$ and $C_n$. Each of the vapor transfer lines 44 interconnects corresponding evaporator and condenser stages. The various evaporator stages of the second series 42 are designated respectively as $E_1'$, $E_2'$, $E_3'$, ... $E_{n-8}'$, $E_{n-7}'$, $E_{n-6}'$, and $E_{n-5}'$. Thus it will be seen that there are five less evaporator stages in the second series 42 than in the first series 40. The reason for this is that even though in this multiple cycle system the temperature of the incoming liquids to the first evaporator stage of each series is the same, the higher salt concentration in the liquids entering the second series results in a higher boiling point elevation. Since the vapors produced in evaporator stages of higher boiling point elevation require relatively colder condenser stages for effective condensation, it is not possible to transfer vapors between corresponding ones of the second series of evaporator stages 42 and the condenser stages 48. Thus, as shown in FIG. 3 vapor transfer lines 50 interconnect the first evaporator stage $E_1'$ with the third condenser stage $C_3$ and so on down the stages. Also, by way of illustration, the condenser stage $C_{n-3}$ is shown to be bypassed. At least one other condenser stage (not shown) is also bypassed in the present system. The particular condenser stages which are bypassed will depend upon the respective temperature profiles of the condenser and evaporator stages; and this will depend upon the system employed. It is a relatively simple matter however to achieve a matching of the temperature profiles.

In the system of FIG. 3 the first series of evaporator stages are preferably arranged to concentrate incoming sea water from an initial salinity of about 3.5 percent to about 27 percent, while the second series of stages will increase the salinity from 27 percent to about 32 percent at which concentration the bulk of the sodium chloride is recovered in crystaline form and is separated in settling tank 56 from the brine and oil that are returned to said evaporator to further increase the salinity from 32 percent to about 40 percent at which concentration an additional amount of sodium chloride together with magnesium sulfate and sodium bromide are recovered in crystaline form. The residual concentrated brine contains sodium, magnesium and potassium chloride as well as magnesium sulfate. This, in addition to providing a heat savings, as described in my previously mentioned copending application Ser. No. 831,087 filed June 6, 1969, also serves to isolate the salt precipitation effects to the second series of stages.

While a surface active agent or surfactant may advantageously be recycled through both series of evaporator stages, it is possible to limit the use of the surfactant to the first series of stages so that it will not be present, except possibly in minute quantities in the second series of stages from which the sodium and certain other salts are extracted. The system of FIG. 3 operates to recycle the surfactant through only the first series of evaporator stages; and it will be apparent to those skilled in the art that the surfactant can also be recirculated through both series of evaporator stages.

In FIG. 3 the liquid residue from the last stage $E_n$ of the first series of evaporator stages passes into a stratifying tank 52 where it settles into an upper oil layer, an interphase, surfactant containing layer and a lower brine layer (brine concentration about 27 percent). The oil layer is passed to the washers $7_a$ ... $7_n$ and the cooler separator 17 as in the system of FIG. 1. The brine layer passes to the third heat exchanger 4; and the interphase layer passes into the separator 25 where it loses a substantial portion of its oil and water content as in the system of FIG. 1. The stratifying tank 52 may be similar to the separator 8 of FIG. 1 except that the brine concentration in the system of FIG. 1 is 32 percent requiring the separation of the precipitated sodium chloride which does not precipitate at 27 percent salinity. The surfactant from the separator, along with entrained insolubles such as calcium carbonate and calcium sulfate, passes into the mixer 26 where incoming sea water of low salinity (about 3.5 percent concentration) mixes with it and dissolves the surfactant. This mixture is passed to the separator 9 where the calcium salts are allowed to settle and are recovered. The dissolved surfactant and brine from the separator 9 then mix with additional incoming sea water and pass with it through the second heat exchanger 5 and into the mixer 1 where the brine-surfactant mixture is combined with hot oil which has been heated in the condenser stages and in the heater 11. The oil-brine-surfactant mixture then passes down through the first series of evaporator stages $E_1$ ... $E_n$.

The brine which has been concentrated in the first series of evaporator stages and separated in the stratifying tank 52 is passed, along with brine recovered in the separator 25, to the third heat exchanger 4 where it is heated.

This brine, which is essentially free of surfactant is then mixed in a second brine-oil mixer 54 with additional hot oil which has been heated in the condenser stages and in the heater 11. This heated oil and concentrated brine mixture then passes through the second series of evaporator stages 42.

Since the brine concentration entering the second series of evaporator stages is very high it soon reaches a point where sodium salts begin to precipitate. These sodium salts may be recovered by providing a settling tank 56 at an intermediate point along the second series of evaporator stages. The brine, which at this point has reached a concentration of about 32 percent is allowed to settle and the sodium chloride which precipitates out is withdrawn from the bottom of the tank 56 and transferred to a final refining and drying operation indicated at 58.

Oil is withdrawn from the upper part of the tank 56, and brine from an intermediate part; and these two liquids are mixed and returned to the second series of evaporator stages where the brine is further concentrated down to about 40 percent. The brine residue from the last evaporator stage $E_{n-5}'$ is admitted to a final settling tank 60. Oil is drawn off from the upper region of this tank and is returned to the oil washer stages $7_a \ldots 7_n$ and the cooler-separator 17. The precipitated salts and the highly concentrated brine are recovered from the lower region of the tank 60.

Having described the invention with particularity with reference to the preferred embodiments of the same, and having referred to some of the possible modifications thereof, it will be obvious to those skilled in the art, after understanding the invention, that other changes and modifications may be made therein without departing from the spirit and scope of the invention; and the appended claims are intended to cover such changes and modifications as are within the scope of the invention.

What is claimed is:

1. A method for separating surfactant from a mixture thereof with entrained insoluble calcium salts which comprises treating said mixture with a low concentration brine solution to dissolve said surfactant in said brine solution and to separate said calcium salts as an insoluble discrete phase.

2. A multiple cycle multiple stage flash evaporation and condensation system comprising a first series of flash evaporation stages arranged to permit a continuous flow therethrough of a solution having a volatile component and to subject said solution to progressively decreasing temperatures in each stage whereby vaporization of said component takes place at lower temperatures in each stage, a second similar series of evaporation stages, means for reheating said solution after its passage through said first series of stages and for transferring the heated solution to said second series of evaporation stages, a common series of condenser stages maintained at successively lower temperatures for condensing the vapors produced in each of said series of evaporation stages and vapor transfer means for transferring vapors from said evaporation stages to said condenser stages for condensation thereof, said vapor transfer means from said second series of evaporation stages being arranged to bypass at least the highest temperature portion of said series of condenser stages to compensate for increased boiling point elevation of the solution passing through said second series of evaporation stages.

3. A multiple cycle multiple stage flash evaporation and condensation system comprising a first series of flash evaporation stages arranged to permit a continuous flow therethrough of a solution having a volatile component and to subject said solution to progressively decreasing temperatures in each stage whereby vaporization of said component takes place at lower temperatures in each stage, a second similar series of evaporation stages, means for reheating said solution after its passage through said first series of stages and for transferring the heated solution to said second series of evaporation stages, a common series of condenser stages maintained at successively lower temperatures for condensing the vapors produced in each of said series of evaporation stages and vapor transfer means for transferring vapors from said evaporation stages to said condenser stages for condensation thereof, at least some of the condenser stages being bypassed by the vapor transfer means from said second series of evaporation stages to provide a condenser stage temperature profile matched to the evaporator stage temperature profile of said second series of evaporator stages.

4. A method for separately recovering sodium chloride and calcium salts from a concentrated brine solution containing water insoluble calcium salts and admixed with a heat carrying oil and further containing a surfactant capable of reducing the interfacial tension between the concentrated solution and said oil, the steps of stratifying as substantially separate entities, the oil, the concentrated brine solution, an interphase of the calcium salts plus surfactant and lastly, precipitated sodium chloride, separating the oil and the concentrated brine solution from the interphase, adding dilute brine solution to and mixing it with the separated interphase to form a first modified solution containing said interphase and said dilute brine solution, settling said calcium salts from said first modified solution to form a further modified solution comprising brine and dissolved surfactant forming a heated mixture of said further modified solution and oil, and vaporizing water from said heated mixture to concentrate said solution and precipitate sodium chloride.

5. Apparatus for separating salts from water including a multistage evaporation unit through which a mixture of water to be desalted, a heat transfer liquid and a surfactant material is passed and in each of the several stages of which at least a portion of the water is vaporized and removed, first separator means connected to said evaporation unit to receive residue, high salt content water, heat transfer liquid and surfactant material, said first separator means being operative to permit stratification of residue components into layers including an interphase layer containing surfactant material and low solubility salts, means operative to separate said heat transfer liquid and said high salt content water from said interphase layer, second separator means connected to receive said resulting surfactant material and low solubility salts means for admitting additional water to be desalted into said second separator means to dissolve said surfactant material and permit separation of said low solubility salts, and means for heating said additional water and surfactant material, combining same with heat transfer liquid and passing the resulting mixture back through said evaporation unit.

6. A method for separating a volatile solvent from a liquid solution of non-volatile solute by evaporation which comprises contacting said solution in a vaporization zone with a liquid heat transfer medium substantially insoluble in said solution and a surface active agent for reducing interfacial tension between the solution and the medium said contacting being effected under conditions of pressure and temperature effective to vaporize a portion of said volatile solvent, thereby increasing the concentration of solute therein and decreasing the solubility of surface active agent in the remaining portion of the solvent by an amount such that at least the latter part of the evaporation is effected in the presence of dispersed particles of surface active agent, and, during said latter part of the evaporation, wherein neither the heat transfer medium nor the surface active agent is readily soluble in the remaining concentrated solution, promoting heat transfer from the heat transfer medium to the solution by maintaining the solution, the heat transfer medium and the surface active agent in a state of agitation to maintain said particles of surface active agent dispersed within the mixture of solution and heat transfer medium thereby to reduce the solution-liquid heat transfer medium interfacial tension.

7. A method according to claim 6, wherein said evaporation is carried out to a point where the resulting concentration of the solution is such as to preclude dissolving therein of a substantial portion of said surface active agent and wherein said solution as so concentrated is separated and said surface active agent is recovered.

8. A method according to claim 7, wherein said surface active agent is recycled by contacting and dissolving it in incoming solution of low concentration.

9. A method according to claim 6, wherein said liquid heat transfer medium comprises a hydrocarbon oil.

10. A method according to claim 6, wherein said solution is in the dispersed phase and said heat transfer medium is in the continuous phase.

11. A method according to claim 6, wherein said solution comprises brine.

12. A method according to claim 6, wherein said surfactant comprises at least one member selected from the group consisting of fatty alcohol phosphate, sodium lauryl sulfate, sodium dioctyl sulfo succinate and sodium dodecyl benzene sulfonate.

13. A method according to claim 12, wherein said surfactant comprises sodium lauryl sulfate.

14. A method according to claim 6, wherein said contacting is carried out in a series of vaporization stages in fluid communication therebetween of successively decreasing pressures and temperatures whereby to vaporize a part of said solvent in each of said stages.

15. A method according to claim 14, wherein said solution comprises brine.

16. A method according to claim 15, wherein nondissolved surfactant present in the liquid residue obtained from the final vaporization stage is recovered for reuse in the process by dissolving said surfactant in water having a lower salt concentration than said brine.

17. A method according to claim 16, wherein the brine employed for dissolving the surfactant comprises at least a portion of the feed brine.

18. A method according to claim 15, wherein said liquid heat transfer medium comprises a hydrocarbon oil.

19. A method according to claim 18, wherein said oil is recovered for reuse in the process by washing same with a low salt concentration brine solution.

20. A method according to claim 19, wherein said brine solution comprises at least a portion of the feed brine.

21. A method according to claim 16 wherein prior to said dissolving the surfactant is settled into an interphase layer between the heat transfer medium and the solution and said interphase layer is separated from said heat transfer medium and from said solution.

22. A method according to claim 21 wherein said interphase layer includes substantial amounts of both said heat transfer medium and said solution along with said surfactant.

23. A method according to claim 22 wherein said heat transfer medium is oil, wherein said solution is concentrated brine, and wherein said interphase layer additionally contains non-dissolved solids.

24. A method according to claim 23 wherein oil and concentrated brine are removed from said interphase layer before dissolving said surfactant in said water.

25. A method according to claim 14 wherein said contacting is carried out in a multiple cycle system wherein the concentrated solution from the last of said series of vaporization stages is reheated and passed again through a subsequent series of vaporization stages.

26. A method according to claim 25 wherein said surface active agent is separated from said solution between successive cycles and is returned to incoming solution to said first cycle.

27. A method according to claim 25 wherein said each of said series of vaporization stages shares a similar temperature profile and wherein vapors are transferred from the vaporization stages of each series to corresponding stages of a common condenser series.

28. A method according to claim 25 wherein said solution is sea water and wherein the temperatures and pressures in said stages are controlled to produce a maximum brine concentration of about 27 percent at the end of the first series so that no salts precipitate therefrom, and a final concentration of about 40 percent at the end of the second series.

29. A method according to claim 28 wherein at an intermediate point along said second series said sea water is allowed to settle for separation of precipitated sodium chloride.

\* \* \* \* \*